United States Patent
Wang et al.

(10) Patent No.: US 9,338,359 B2
(45) Date of Patent: May 10, 2016

(54) METHOD OF CAPTURING AN IMAGE IN A DEVICE AND THE DEVICE THEREOF

(71) Applicant: Beijing Xiaomi Technology Co.,Ltd., Beijing (CN)

(72) Inventors: Bo Wang, Beijing (CN); Jingwei Cai, Beijing (CN)

(73) Assignee: XIAOMI INC., Haidan District, Beijing (CN)

( * ) Notice: Subject to any disclaimer, the term of this patent is extended or adjusted under 35 U.S.C. 154(b) by 33 days.

(21) Appl. No.: 13/943,798

(22) Filed: Jul. 17, 2013

(65) Prior Publication Data
US 2014/0036131 A1     Feb. 6, 2014

(30) Foreign Application Priority Data

Aug. 6, 2012 (CN) .......................... 2012 1 0276616

(51) Int. Cl.
*H04N 5/232*     (2006.01)

(52) U.S. Cl.
CPC ....... *H04N 5/23293* (2013.01); *H04N 5/23216* (2013.01)

(58) Field of Classification Search
CPC ...................... H04N 5/23216; H04N 5/23293
USPC ................. 348/207.99, 211.13, 211.8, 231.6, 348/333.01, 333.02, 333.03, 333.11, 348/333.12, 345
See application file for complete search history.

(56) References Cited

U.S. PATENT DOCUMENTS

| | | | | |
|---|---|---|---|---|
| 6,057,845 A | * | 5/2000 | Dupouy | 715/863 |
| 6,249,606 B1 | * | 6/2001 | Kiraly et al. | 382/195 |
| 7,004,394 B2 | * | 2/2006 | Kim | 235/472.01 |
| 2010/0020221 A1 | * | 1/2010 | Tupman et al. | 348/333.01 |
| 2010/0062803 A1 | * | 3/2010 | Yun et al. | 455/556.1 |
| 2010/0265196 A1 | | 10/2010 | Lee et al. | |

FOREIGN PATENT DOCUMENTS

| | | |
|---|---|---|
| CN | 101668119 A | 3/2010 |
| CN | 102196178 A | 9/2011 |
| CN | 102316221 A | 1/2012 |
| CN | 102541320 A | 7/2012 |
| CN | 102866802 A | 1/2013 |
| CN | 102902452 A | 1/2013 |

OTHER PUBLICATIONS

"Copy of International Search Report for PCT/CN2013/080886".

* cited by examiner

*Primary Examiner* — Lin Ye
*Assistant Examiner* — Chriss Yoder, III
(74) *Attorney, Agent, or Firm* — Jun He Law Offices P.C.; James J. Zhu

(57) ABSTRACT

A method of capturing an image in a device and the device thereof are provided. The method comprises displaying a preview of an image to be captured on a screen of the device; allowing a user to execute an action input through a spatial relationship with a region, wherein the region is any area on the surface of the screen; sensing the action input; comparing the action input to a template stored in a memory of the device, wherein the template is associated with image capturing; and capturing the image if the action input substantially matches the template. The method of capturing images in the device and the device thereof provided by the present disclosure permit a user to easily capture images without clicking a fixed area on the screen.

17 Claims, 9 Drawing Sheets

METHOD OF CAPTURING AN IMAGE IN A DEVICE AND THE DEVICE THEREOF

CROSS-REFERENCE TO RELATED APPLICATIONS

This application is related to, and claims priority to Chinese Patent Application No. 201210276616.2 filed on Aug. 6, 2012, which is incorporated by reference herein in its entirety.

TECHNICAL FIELD

The present disclosure generally relates to technologies of electronic devices, and more particularly, to a method of capturing an image in a device and the device thereof.

BACKGROUND

Electronic devices (such as mobile phones, gaming devices, personal digital assistants, and tablet computers) have been configured to perform various complicated functions. Examples of such functions include capturing images and video, playing audio and video files, supporting game playing, and receiving broadcasting. There are ongoing efforts to support and increase the functionality of electronic devices. Such efforts include hardware improvements, as well as changes and improvements in software components. Furthermore, touch screens or proximity sensors are often used in many electronic devices including mobile phones. Accordingly, many functions, such as the function of capturing images and video, may be performed by using the touch screen or proximity sensor.

SUMMARY

In one aspect of the present disclosure, the method of capturing an image in a device comprises displaying a preview of an image to be captured on a screen of the device; allowing a user to execute an action input through a spatial relationship with a region, wherein the region is any area on the surface of the screen; sensing the action input; comparing the action input to a template stored in a memory of the device, wherein the template is associated with image capturing; and capturing the image if the action input substantially matches the template.

In some embodiments, the action input is selected from the group consisting of a touch, a swipe, a gesture, a function of time, pressure, temperature, finger prints, and any combination thereof.

In some embodiments, the spatial relationship with the region is on a surface of the region, onto the surface of the region, against the surface of the region, away from the surface of the region, or above the surface of the region.

In some embodiments, the region is any area within the displayed preview of the image.

In some embodiments, the template is predefined by a device provider or the user.

In some embodiments, the template is predefined by the user via the followed steps: sensing a user input for predefining the template, and storing parameter values associated with the user input in the memory of the device as the template.

In some embodiments, the screen is a touch screen and the action input is sensed by one or more touch sensors of the touch screen.

In some embodiments, the action input is sensed by one or more proximity sensors of the device.

In some embodiments, the method of capturing the image in the device further comprises a step of displaying an image capturing identifier on the screen after the device determines the action input substantially matches the template, wherein the image is captured after the image capturing identifier is displayed.

In some embodiments, the method of capturing the image in the device further comprises a step of automatically focusing a focus area associated with the region after the device determines the action input substantially matches the template, wherein the image is captured after the step of focusing.

In some embodiments, a focus indicator is displayed in the region.

In another aspect of the present disclosure, the device for capturing the image comprises a processor; a sensor coupled to the processor, the sensor configured to sense an action input and send the sensed action input to the processor; an image capturing unit coupled to the processor, the image capturing unit configured to capture the image; a screen coupled to the processor; and a memory coupled to the processor, wherein the processor is configured to perform steps comprising: displaying an preview of an image to be captured on the screen of the device; allowing a user to execute the action input through a spatial relationship with a region, wherein the region is any area on the surface of the screen; sensing the action input; comparing the action input to a template stored in the memory of the device, wherein the template is associated with image capturing; and capturing the image if the action input substantially matches the template.

In another aspect of the present disclosure, the device for capturing the image comprises means for displaying a preview of an image to be captured on a screen of the device; means for allowing a user to execute an action input through a spatial relationship with a region, wherein the region is any area on the surface of the screen; means for sensing the action input; means for comparing the action input to a template stored in a memory of the device, wherein the template is associated with image capturing; and means for capturing the image if the action input substantially matches the template.

In another aspect of the present disclosure, a computer readable recording medium stores one or more programs for use by the processor of the device to perform a process comprising: displaying a preview of an image to be captured on a screen of the device; allowing a user to execute an action input through a spatial relationship with a region, wherein the region is any area on the surface of the screen; sensing the action input; comparing the action input to a template stored in a memory of the device, wherein the template is associated with image capturing; and capturing the image if the action input substantially matches the template.

In another aspect of the present disclosure, a graphical user interface on the device with a sensor, a screen, a memory and a processor to execute one or more programs stored in the memory, comprises a preview of an image to be captured which is displayed on the screen of the device, wherein a user is allowed to execute an action input through a spatial relationship with a region, wherein the region is any area on the surface of the screen; the action input is sensed and compared to a template stored in the memory of the device, wherein the template is associated with image capturing; and the image is captured if the action input substantially matches the template.

It is to be understood that both the foregoing general description and the following detailed description of the present disclosure are exemplary and explanatory, and are intended to provide further explanation of the invention as claimed.

BRIEF DESCRIPTION OF THE DRAWINGS

The accompanying drawings are included to provide a further understanding of the present application and are incorporated in and constitute a part of this specification. The drawings illustrate the embodiments of the present disclosure and together with the description serve to explain the principles of the present disclosure. Other embodiments of the present disclosure and many of the intended advantages of the present disclosure will be readily appreciated, as they become better understood by reference to the following detailed description. The elements of the drawings are not necessarily to scale relative to each other. Like reference numerals designate corresponding similar parts.

DESCRIPTION OF EMBODIMENTS

In the following detailed description, reference is made to various specific embodiments of the present disclosure. These embodiments are described with sufficient details to enable those skilled in the art to practice the present disclosure. It is to be understood that other embodiments may be employed, and that various structural, logical, and electrical changes may be made without departing from the spirit or scope of the present disclosure. Wherever possible, the same reference numbers will be used throughout the drawings to refer to the same or like parts.

As used herein, a "device" may be implemented using a variety of different types of terminal devices. Examples of such terminal devices include pads, mobile phones, computers, digital broadcast terminals, personal digital assistants, and the like.

As used herein, an "action input" is a user input operation selected from the group consisting of a touch, a swipe, a gesture, a function of time, pressure, temperature, finger prints, and any combination thereof. In certain embodiments of the present disclosure, the "action input" comprises a touch for a particular period of time or with particular pressure. In certain embodiments of the present disclosure, the "action input" comprises a swipe with a particular length.

As used herein, a "template" is a touch, a swipe, a gesture, a function of time, pressure, temperature, finger prints, and any combination thereof. The template is pre-stored in the memory of the device and used as an identifier, or key to determine whether the action input can activate an image capturing operation.

As used herein, a "spatial relationship with a region" is on the surface of the region, onto the surface of the region, against the surface of the region, away from the surface of the region, or above the surface of the region.

Figure 1:
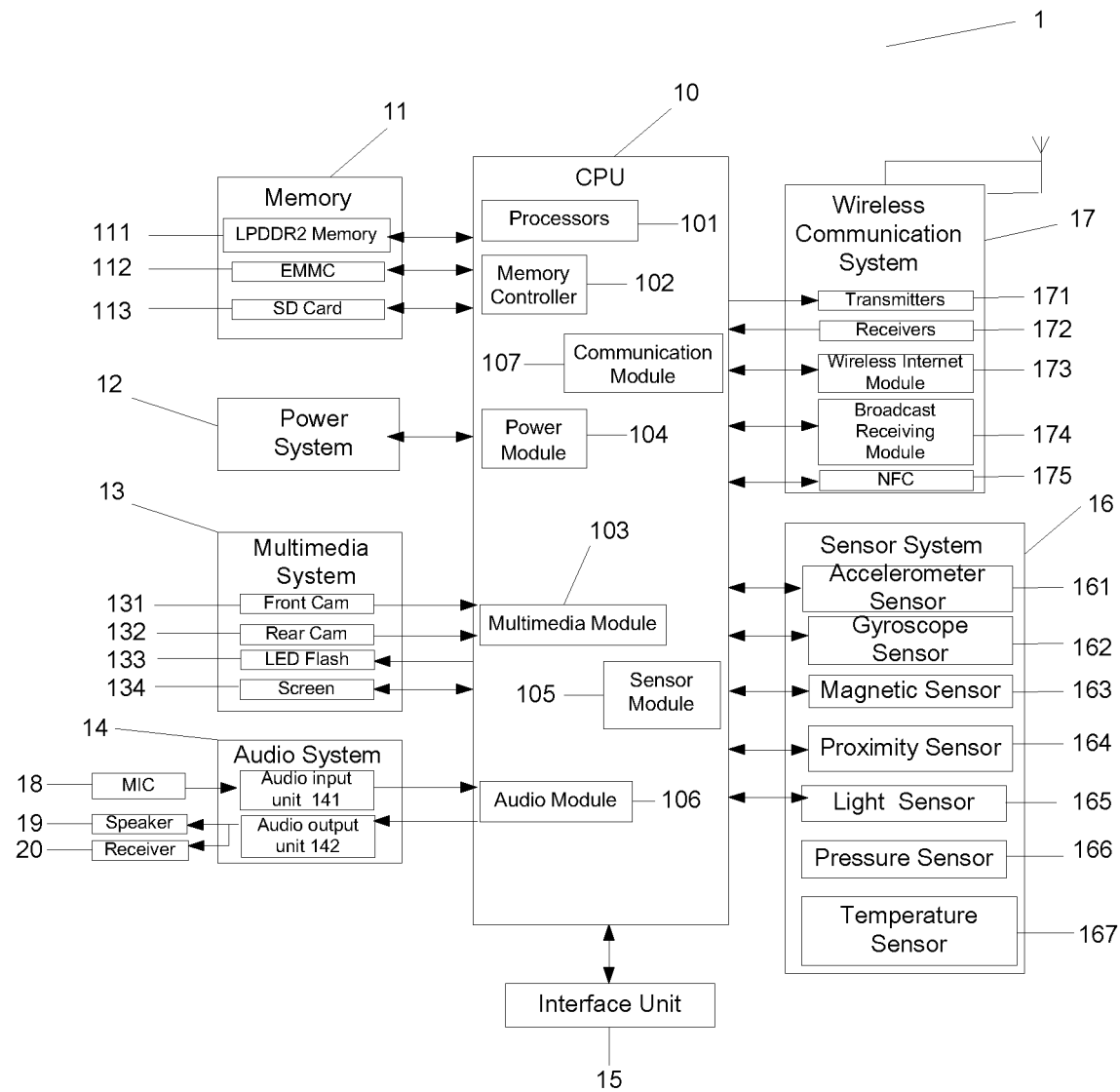
FIG. 1 is a block diagram illustrating the device in accordance with some embodiments of the present disclosure.

FIG. 1 is a block diagram illustrating the device 1 in accordance with some embodiments of the present disclosure. The device 1 may include a central processing unit (CPU) 10, a memory 11, a power system 12, a multimedia system 13, an audio system 14, an interface unit 15, a sensor system 16, a wireless communication system 17, a microphone ("MIC") 18, a speaker 19, and a receiver 20.

FIG. 1 illustrates the device 1 as having various components, but it is understood that implementing all of the illustrated components is not required. Greater or fewer components may alternatively be implemented.

The CPU 10 typically controls the overall operations of the device, such as the operations associated with display, calls, data communications, camera operations, and recording operations. The CPU 10 may include one or more processors 101. Moreover, the CPU 10 may include several modules which facilitate the interaction between the CPU 10 and the other systems. In some embodiments, the CPU 10 includes one or more processors 101, a memory controller 102, a multimedia module 103, a power module 104, a sensor module 105, an audio module 106, and a communication module 107. For instance, the CPU 10 includes the multimedia module 103 to facilitate the multimedia interaction between the multimedia system 13 and the CPU 10.

The memory 11 is generally used to store various types of data to support the processing, control, and storage requirements of the device 1. Examples of such data include program instructions for applications operating on the device 1, contact data, phonebook data, messages, pictures, video, etc. The memory 11 shown in FIG. 1 comprises a lower power double data rate 2 (LPDDR2), memory 111, an embedded multimedia card (EMMC) 112, and a secure digital (SD) card 113. However, the memory 11 may also be implemented using any type (or combination) of suitable volatile and non-volatile memory or storage devices, including static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage devices. Access to the memory 11 by other components of the device 1, such as the CPU 10, may be controlled by the memory controller 102.

The power system 12 provides power required by the various components of the device 1. The power system 12 may include a power management system, one or more power sources, and any other components associated with the generation, management, and distribution of power in the device 1. Access to the power system 12 by other components of the device 1, such as the CPU 10, is implemented by the power module 104.

The multimedia system 13 includes a screen 134 providing an output interface between the device 1 and the user. In some embodiments, the screen 134 may comprise a liquid crystal display (LCD) and a touch panel (TP). If the screen 134 includes the touch panel, the screen 134 may be implemented as a touch screen to receive input signals from the users. The touch panel includes many touch sensors to sense touches, swipes, time, pressure, temperature, and gestures on the touch panel. The touch sensors may not only sense the boundary of the touch or the swipe action, but may also sense a period of time and a pressure associated with the touch or swipe action. The multimedia module 103 may include a touch-screen control module (not shown in FIG. 1) to receive electrical signals from or send electrical signals to the screen 134. Additionally, in some embodiments, a LED flash 133 is also included in the multimedia system 13.

In some embodiments, the multimedia system 13 comprises a front camera 131 and a rear camera 132. The front camera 131 or rear camera 132 is used as an image capturing unit to capture the images. The front camera 131 and rear camera 132 may receive an external multimedia datum while the device 1 is in a particular mode, such as a photographing mode or a video mode. For example, the front camera 131 is located on the front face of the device 1 and the rear camera 132 is located on the back face of the device 1. The camera 131 or 132 may be a fixed optical lens system or may have focus and optical zoom capability. Although not depicted in FIG. 1, the multimedia module 103 may include an electronic or digital preview program to display images to be captured or captured images that are before the front camera 131 or rear camera 132 on a portion of the screen 134. The device 1 includes all of the needed hardware and/or software for implementing the digital camera functions. The details will be descried below.

The audio system 14 includes an audio input unit 141 and an audio output unit 142. The audio input unit 141 is configured to transmit the audio signal received by the MIC 18 to the device 1. The audio output unit 142 is configured to output the processed audio signal to the external components, such as the speaker 19 or the receiver 20. The MIC 18 is configured to receive an external audio signal while the device 1 is in a particular mode, such as a call mode, a recording mode, and a voice recognition mode. This audio signal is processed and converted into digital data. Data generated by the audio input unit 141 may also be stored in the memory 11 or transmitted via one or more modules of the wireless communication system 17.

The interface unit 15 provides the interface between the CPU 10 and peripheral interface modules (not shown in FIG. 1), such as a keyboard, a click wheel, buttons, and the like. The buttons may include but are not limited to a home button, a volume button, a starting button, and a locking button.

The device 1 may also have the sensor system 16, including one or more sensors to provide status measurements of various aspects of the device 1. For instance, the sensor system 16 may detect an open/closed status of the device 1, relative positioning of components (e.g. a display and a keypad) of the device 1, a change of position of the device 1 or a component of the device 1, a presence or absence of user contact with the device 1, orientation or acceleration/deceleration of the device 1, and a change of temperature of the device 1. Access to the sensor system 16 by other components of the device 1, such as the CPU 10, is implemented by the sensor module 105.

The sensor system 16 may include a proximity sensor 164, which is configured to detect the presence of nearby objects without any physical contact. The sensor system 16 may also include a light sensor 165, such as CMOS or CCD image sensors, for use in imaging applications. In some embodiments, the sensor system 16 may also include an accelerometer sensor 161, a gyroscope sensor 162, a magnetic sensor 163, a pressure sensor 166, and a temperature sensor 167 as shown in FIG. 1.

The device 1 may include a wireless communication system 17 configured with several commonly implemented communication components to facilitate communication with other devices. Access to the wireless communication system 17 by other components of the device 1, such as the CPU 10, is implemented by the communication module 107. The wireless communication system 17 typically includes one or more components which permit wireless communication between the device 1 and a wireless communication network. The transmitters 171 are configured to transmit the digital data, for instance, stored in the memory 11, directly to other devices or indirectly over the network. The receivers 172 are configured to receive external digital data directly from other devices or indirectly over the network. If desired, data received by the receivers 172 may be stored in a suitable device, such as the memory 11. The wireless internet module 173 is configured to support internet access for the device 1 by internally or externally coupling to the device 1. The device 1 may be accessed using any type (or combination) of suitable internet connection methods including WIFI, 2G, 3G, and other similar methods.

The broadcast receiving module 174 is configured to receive a broadcast signal and/or broadcast associated information from an external broadcast management entity via a broadcast channel. The broadcast management entity typically refers to a system which can transmit a broadcast signal and/or broadcast associated information. The broadcast receiving module 174 may be configured to receive broadcast signals transmitted from various types of broadcast systems, including but not limited to frequency modulation (FM) broadcasting, digital multimedia broadcasting-terrestrial (DMB-T), and digital multimedia broadcasting-satellite (DMB-S). Receiving multicast signals is also possible. If desired, data received by the broadcast receiving module 174 may be stored in a suitable device, such as the memory 11.

The near field communication (NFC) 175 may facilitate relatively short-range communications. Suitable technologies for implementing this module include radio frequency identification (RFID), infrared data association (IrDA), ultra-wideband (UWB), networking technologies commonly referred to as Bluetooth (BT), and other similar technologies.

In the following description, the method of capturing the image in the device 1 in accordance with some embodiments of the present disclosure is explained. While the process flow described below includes a plurality of steps that appear to occur in a specific order, it should be apparent that those procedures may include either fewer or more operations, which may be executed serially or in parallel.

Figure 2:
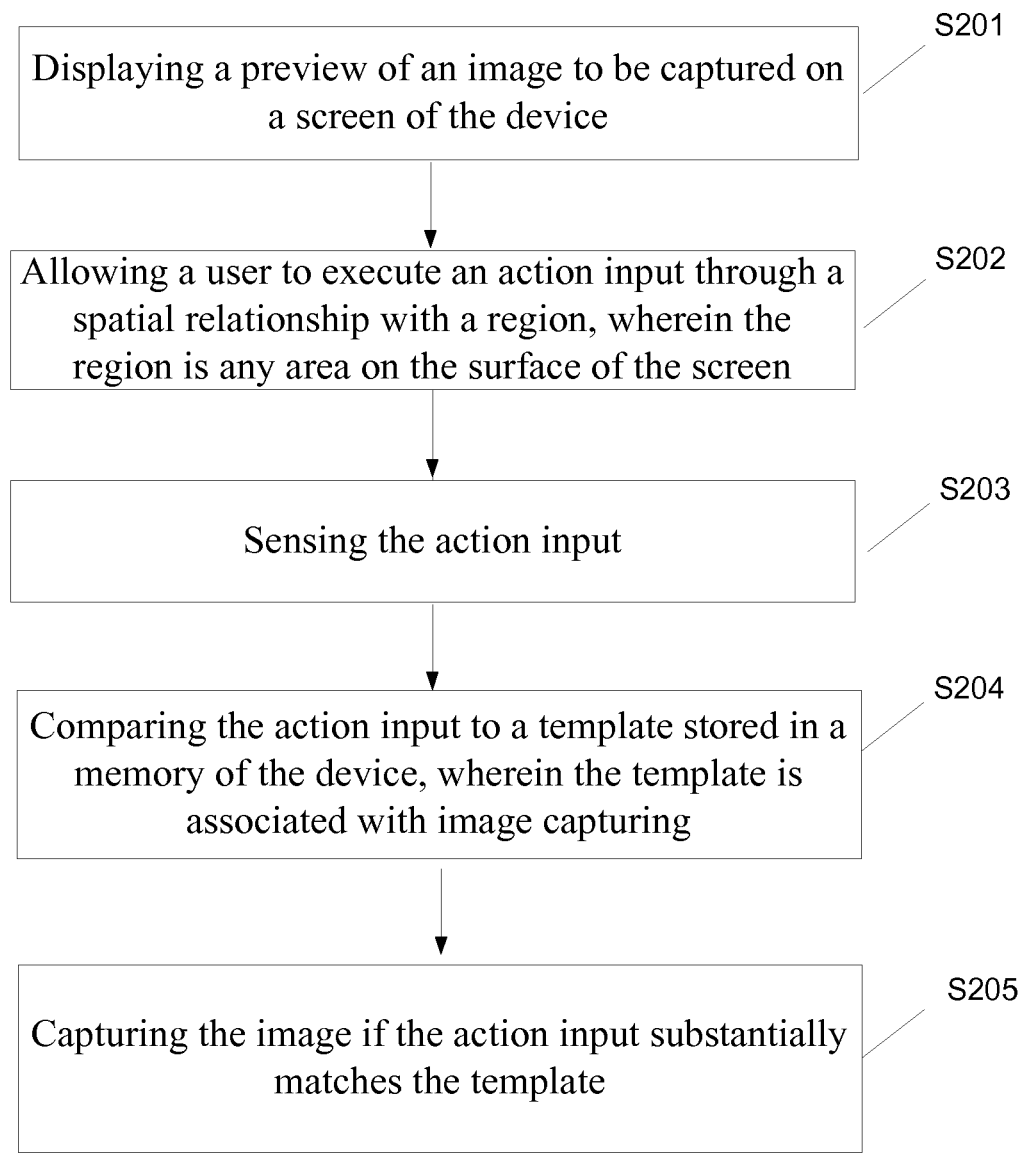
FIG. 2 is a flow diagram illustrating the method of capturing an image in the device in accordance with some embodiments of the present disclosure.

FIG. 2 is a flow diagram illustrating the method of capturing the image in the device in accordance with some embodiments of the present disclosure. Referring to FIG. 2 in step 201, a preview of the image to be captured is displayed on the screen 134 of the device 1 when the device 1 is placed in a photographing mode or a video mode. As used herein, the "preview of the image to be captured" may be the preview of a still image or one of a series of images (e.g., a video) that is before the front camera 131 or rear camera 132. The user may move the camera slightly so that the desired screen appears on a preview portion of the screen 134. In some embodiments, the surface of the screen 134 may only include the preview portion to display the images on the full screen. In other embodiments, the surface of the screen 134 may also include a menu bar portion besides the preview portion. The menu bar portion includes a plurality of menu items which are used to edit the captured images. Additionally, the menu bar portion may include a virtual shutter button whose icon is displayed directly below the preview portion.

While monitoring the screen, the device 1 allows the user to input an action through a spatial relationship with a region in step 202. The region may be any area on the surface of the screen 134. Accordingly, the action input is sensed by sensors in step 203 and compared with a template associated with image capturing in step 204. In step 205, the image is captured if the action input substantially matches the template. The template is pre-stored in the memory 11 of the device 1.

According to the present disclosure, the region may be any area on the surface of the screen. Although in some embodiments the device 1 may include an additional virtual shutter button with a fixed location on the surface of the screen 134, the present disclosure permits the user to select any area other than the location of the virtual shutter button to implement a shutter function, which is called a "full screen shutter."

In some embodiments, the action input is selected from the group consisting of a touch, a swipe, a gesture, a function of time, pressure, temperature, finger prints, and any combination thereof, and the action input is sensed by one or more touch sensors of the touch screen or one or more of the device's proximity sensors or any other sensors the device supports. Accordingly, "spatial relationship with a region" is on, onto, against, away from, or above the surface of the region.

Additionally, according to the present disclosure, the template is predefined by the device provider or the user. The device provider may define parameter values for the action, which is to be recognized as the action of capturing images as the template. For example, the device provider may define the touching of any area on the surface of the screen for more than a particular time interval (e.g., 2 seconds) as the action of capturing images. Therefore, the parameter values, such as the values of the particular time interval, are stored in the memory 11 as the template. In another example, the device provider may define the action of swiping on the surface of the screen with a swiping distance exceeding a predefined length (e.g., 3 centimeters) as the action of capturing images; therefore, the parameter values, such as the predefined length of swiping distance, are stored in the memory 11 as the template. The pre-stored template may be a touch, a swipe, a gesture, a function of time, pressure, temperature, finger prints, and any combination thereof, according to the device provider's or user's device settings.

In some embodiments, the template can be predefined by the user in an initialization procedure. The device 1 may initiate the procedure to allow the user to define the template. The initialization procedure comprises sensing a user input for predefining the template, and storing parameter values associated with the user input in the memory 11 of the device 1 as the template. For example, the user may define the template by typing in the parameter values, or by selecting one or more parameter values from a list. The typed or selected parameter values are then stored in the memory 11 as the template. In some embodiments, the user may define the template by touching or swiping the surface of the screen 134. If the user defines the template by touching the surface of the screen 134 within a particular period of time, or by swiping the surface of the screen 134, the user may be required to repeat the user inputs a number of times to record an average touch time, touch pressure, or length of swiping. Accordingly, the memory 11 stores the average of the touch time, touch pressure, or length of swiping as the template.

Preferably, in some embodiments, the user may directly touch the surface of the region for a period of time as the action input. Accordingly, the touch is sensed by the touch screen's touch sensors, and transmitted to the device 1's processors. If the action input is recognized as a touch on the surface of the region with a substantially same period of touch time as a pre-stored period of touch time in the template, the image will be captured.

Preferably, in some embodiments, the user may swipe or move his finger from a starting point to a target point or from the target point to the starting point on the surface. Accordingly, the swipe is sensed by the touch screen's touch sensors and transmitted to the device 1's processors. Accordingly, if the processor determines that the action input is a swipe, and that the length of the swiping distance substantially matches the predefined length of swiping distance stored in the template, the image will be captured.

Preferably, in some embodiments, the user may directly touch the surface of the region with a particular pressure as the action input. Accordingly, the touch is sensed by the touch screen's touch sensors and transmitted to the device 1's processor. If the action input is recognized as a touch on the surface of the region with a substantially same touch pressure as a pre-stored touch pressure value in the template, the image will be captured.

Preferably, in some embodiments, an operation, such as a gesture above the surface of the screen 134, instead of on the surface of the screen 134, may be sensed as the action input. If the user makes a gesture above the surface of the screen, for example, the user provides the action input by tapping and holding with a particular time in a location above the surface of the screen, the proximity sensor 164 of the device 1 may sense the action input even if the user does not touch the surface of the screen directly. Accordingly, if the action input is sensed as a particular gesture above the surface of the touch screen and is substantially the same as the predefined template, the image will be captured.

Preferably, in some embodiments, the method according to the present disclosure further comprises a step of displaying an image capturing identifier on the screen 134 after the device 1 determines the action input substantially matches the template, wherein the image is captured after the image capturing identifier is displayed. The image capturing identifier may be used to indicate that the action input substantially matches the template. The image capturing identifier is selected from the group consisting of a flash, a change of color, and any combination thereof. In other embodiments, the image capturing identifier may not be displayed before capturing the image.

Preferably, in some embodiments, the method according to the present disclosure further comprises a step of automatically focusing a focus area associated with the region after the device determines that the action input substantially matches the template, wherein the image is captured after the step of focusing. Preferably, a focus indicator is displayed in the selected region. For example, after the device determines that the action input substantially matches the template, the device may automatically initiate a focus mode on the basis of the region where the user input is executed. The focus area can then automatically be determined based on the region. Once the focus area has been determined, an automatic focus scan may be executed. For example, if the user action is a touch with a particular time on the region, then the focus area is associated with the touched region and is set at approximately the same location and size as the touched region. As another example, the focus area may be determined as an area surrounding the region the user touched. After determining the focus area, the focus indicator is displayed in or surrounding the region. The focus indicator may be a frame with any type of shape. Accordingly, the device automatically focuses on a portion of a scene using the focus area and captures the image after the focus indicator is displayed.

In an alternative embodiment, a default autofocus mode may be applied. The default automatic focus mode can set a focus area as a substantially full frame corresponding to the full screen. Accordingly, the default automatic focus mode may set the focus area to a center of the screen, instead of the region where the user input is executed.

In the followed description, some exemplary embodiments will be described to further explain the steps of capturing an image in the device by the user through steps 201 to 205 in accordance with the present disclosure.

Figure 3A:
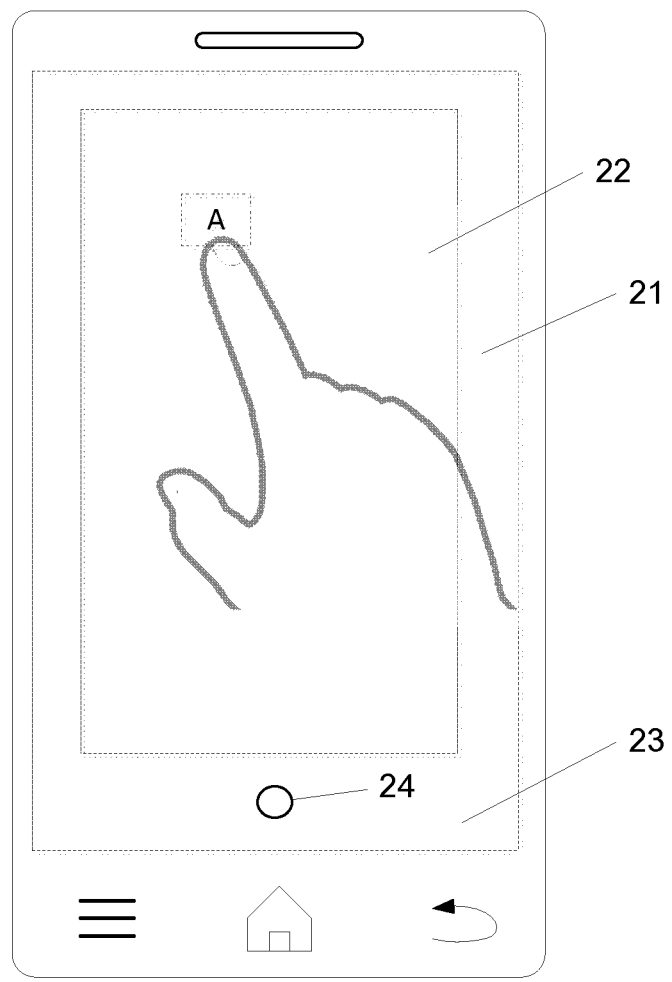
FIGS. 3A to 3C are schematic diagrams illustrating the execution of the action input for capturing images via touching any area on the surface of the screen in accordance with some embodiments of the present disclosure.
Figure 3B:
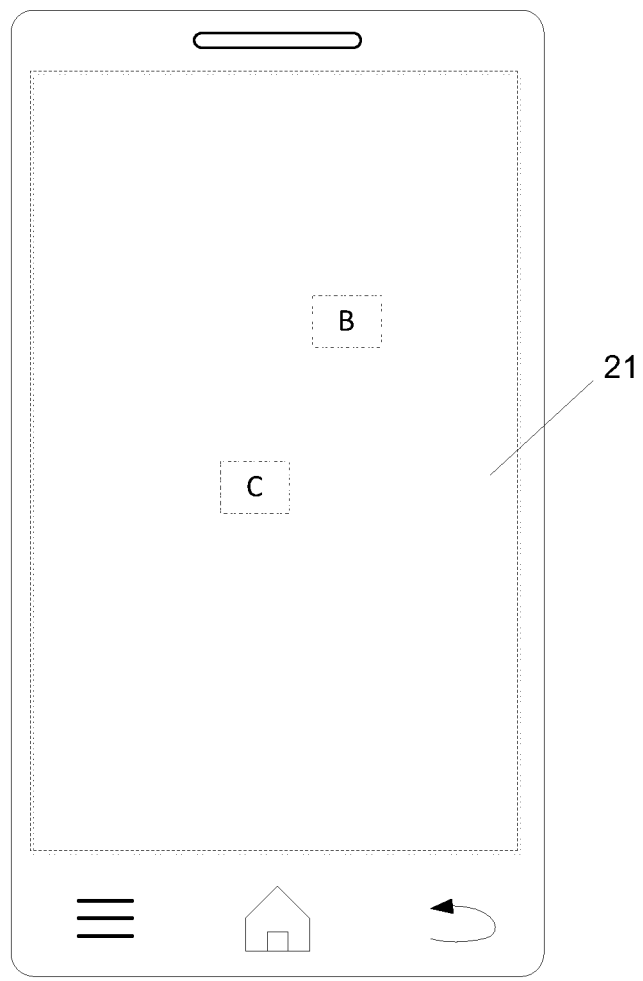
Figure 3C:
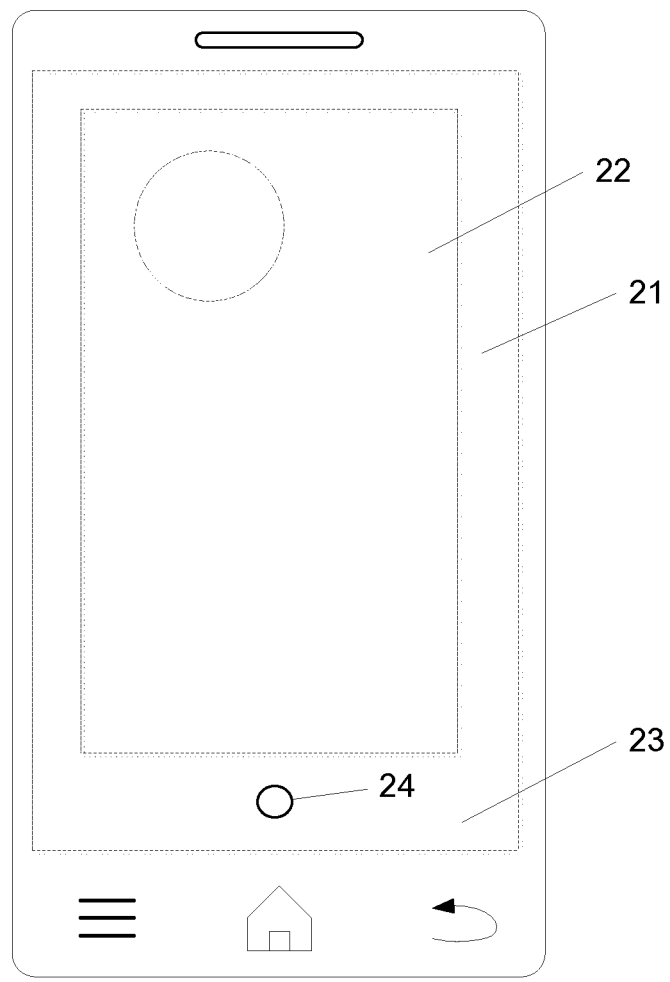

FIGS. 3A to 3C are schematic diagrams illustrating the execution of the action input for capturing images via touching any area on the surface of the screen in accordance with some embodiments of the present disclosure.

Referring to FIG. 3A, the screen 134 of the device 1 is equipped with one or more touch sensors to sense the touch on the surface of the touch screen as an action input. Therefore the screen 134 can be used as an input and output device. The present disclosure can support multiple kinds of touch sensors, including touch foil, touch slice, touch pad, and the like. The touch sensors may be configured to convert the change of pressure or electrostatic capacitance applied on certain parts of the touch screen into electrical input signals. The touch sensors can be further configured to sense the touch pressure, touch location, and touch time. When the touch sensors receive the action input of touching, a corresponding signal will be sent to a touch controller. The touch controller will process the signal and send the corresponding data to the processor.

As shown in FIG. 3A, in the exemplary embodiment, the surface 21 of the touch screen 134 includes two portions: preview portion 22 and a menu bar portion 23. The preview portion 22 is used to display the preview of the image to be captured. The menu bar portion 23 is shown under the preview portion 22, and used to display one ore more menu items for editing the captured image. In the exemplary embodiment shown in FIG. 3A, the menu bar may optionally include a virtual shutter button 24. However, according to the present disclosure, the virtual shutter button 24 is not necessary because the image may be captured by touching any area on the screen's surface. Even if the virtual shutter button 24 is displayed in the screen 134, the image may be captured by touching any area on the screen's surface.

Although the menu bar portion 23 is included as shown in FIG. 3A, it is obvious that the menu bar portion 23 may be not included in some embodiments according to the present disclosure. When the surface 21 does not include the menu bar portion 23, the preview of the image to be captured can be displayed in full screen on the surface 21.

As shown in FIG. 3A, the user may touch a region "A" on the surface 21 for a particular time. The touch sensors sense the action input as a touch on the region "A" in the displayed image preview. Accordingly, the sensed touch action and touch time are transmitted to the processor for determining whether the touch time reaches a predefined time "t" stored in the template. If the touch time reaches the predefined touch time "t" (e.g., 2 seconds) stored in the memory, the processor determines the touch action substantially matches the template.

Accordingly, the image capturing identifier displayed in the screen to indicate the step of capturing the image is prepared because it is determined that the touch time at location "A" reaches the predefined time "t" as stored in the template. The image capturing identifier's color will change, or the image capturing identifier will dually flash at location "A," while the image will be captured at the same time. The captured image will be stored in a designated location such as the memory 11 of the device 1, an SD card connected to the device 1, or the memory of a cloud server.

In the present disclosure, the region may be any area in the surface. As shown in FIG. 3B, the region may be at location "B" or "C" in accordance with the user's preference. Although the surface 21 as shown in the FIG. 3A includes the preview portion 22 and the menu bar portion 23, the surface 21 may only include the preview portion 22 as shown in 3B. When the surface 21 only includes the preview portion, the image to be captured will be displayed in the full screen of the surface. The user may execute the action input, such as a touch action with a particular time, through any area on the entire surface of the device 1. Provided that the action input substantially matches the template (for example, the touch time reaches the predefined time "t" as stored as the template), the image will be captured no matter which area on the surface 21 of the screen 134 is touched.

In addition, the present disclosure is further configured to display a focus area associated with the above region. For example, the touch region "A" as shown in FIG. 3A may be further configured as a location associated with the focus area. For example, the focus area is associated with the region "A" and is set at approximately the same location and size as the region "A." In another example, the focus area is set as a surrounding area of the region "A," whose size is bigger than the size of the region "A." Furthermore, a focus indicator will be displayed to indicate the focus area.

FIG. 3C illustrates the focus area associated with the above region "A." Although the focus area is shown as a circle surrounding the region "A" in of FIG. 3C, the focus area may be selected as a circle, a diamond, and any shape or pattern according to the device provider's presetting. Accordingly, the device automatically focuses using the focus area associated with the region after the device determines that the action input executed in the region substantially matches the template. Accordingly, the image will be captured after the step of focusing.

Figure 4A:
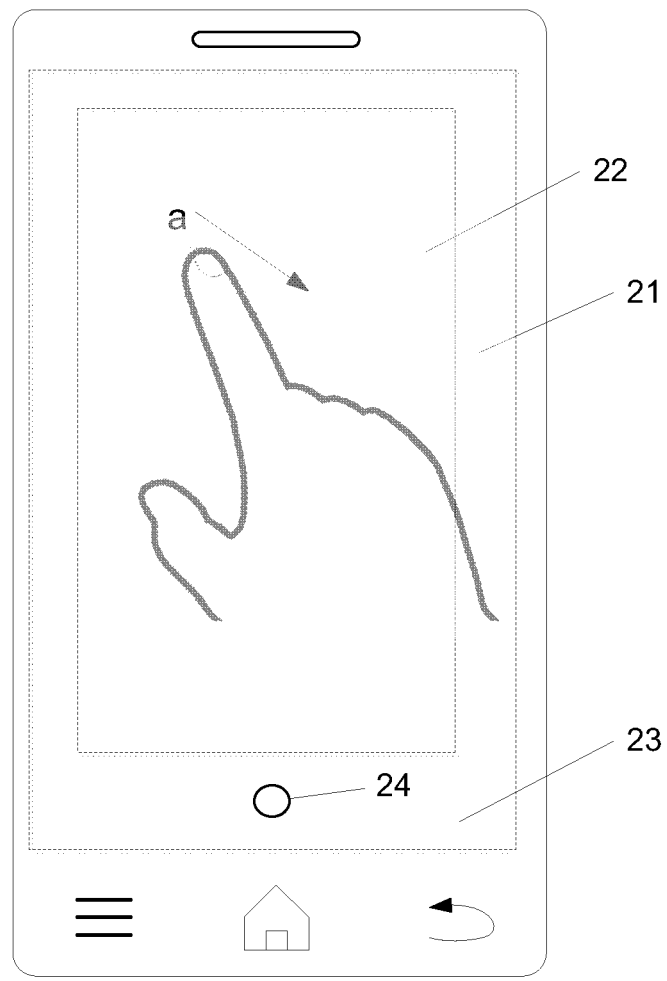
FIGS. 4A to 4C are schematic diagrams illustrating the execution of the action input for capturing images through a swipe on the surface of the screen in accordance with some embodiments of the present disclosure.
Figure 4B:
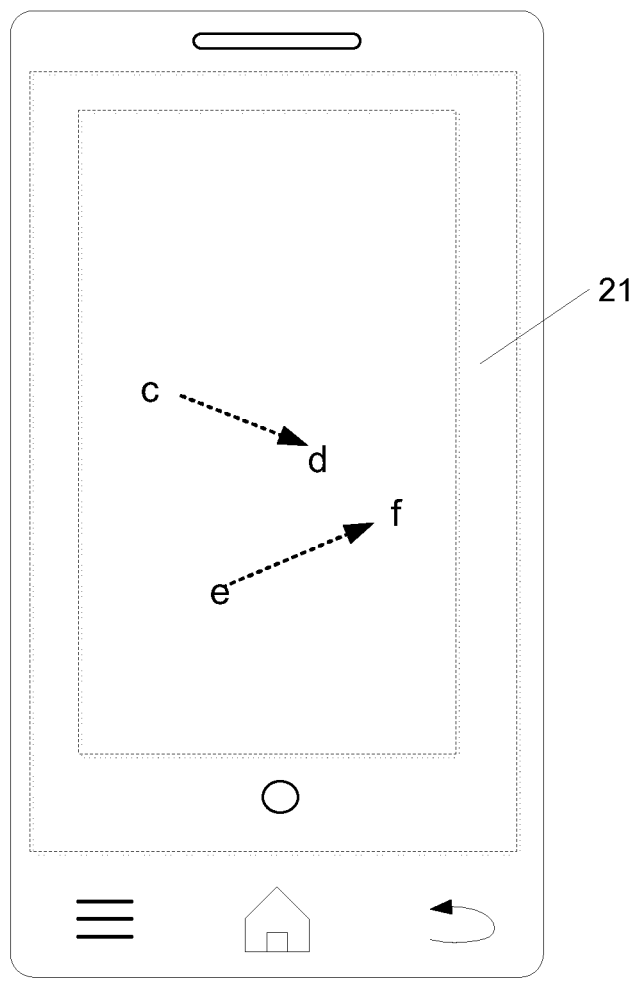
Figure 4C:
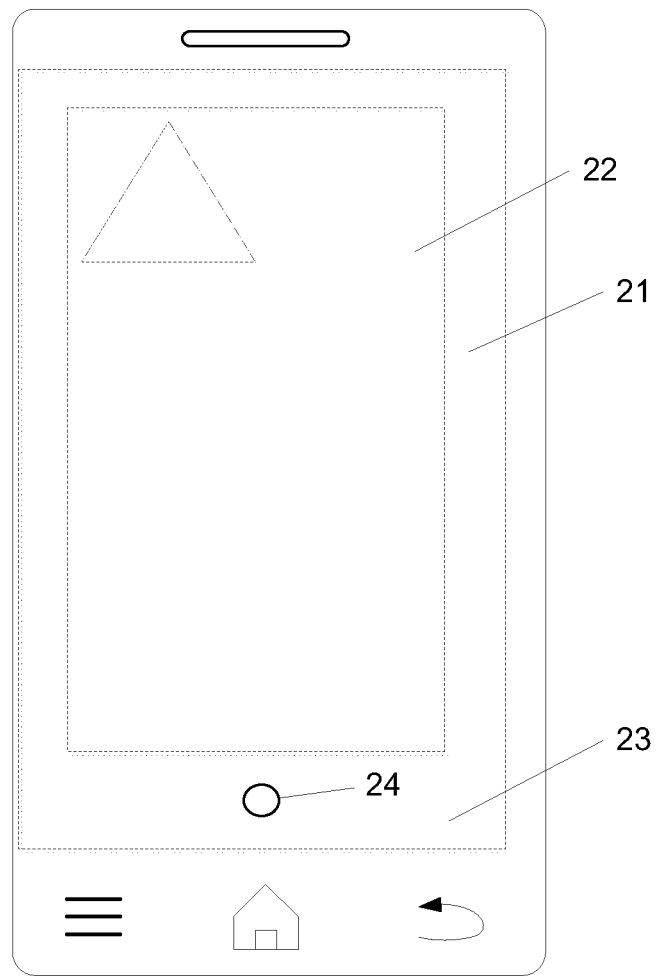

FIGS. 4A to 4C are schematic diagrams illustrating the execution of the action input for capturing images through a swipe on the surface of the screen in accordance with some embodiments of the present disclosure.

Referring to FIG. 4A, the preview of image to be captured is displayed in the preview portion 22. The menu bar portion 23 is shown under the preview portion 22 and used to display one ore more menu items for editing the captured image. In the exemplary embodiment as shown in FIG. 4A, the menu bar includes a virtual shutter button 24. However, according to the present disclosure, the virtual shutter button 24 is not necessary because the image may be captured by executing any swipe with a predefined length on the surface of the screen.

As shown in FIG. 4A, the user may input a swipe between a starting point "a" and a target point "b" as an action input. The length of the swipe "L" can be predefined by the user or the device provider, and stored as the template. When the touch sensors of the touch screen sense the swipe from "a" to "b" on the surface, a corresponding signal will be sent to the touch controller. The touch controller will process the signal and send the corresponding data (such as the length of swiping distance from "a" to "b") to the processor. Hence, the sensed swipe action and parameter values associated with the swipe action, such as the length of swiping distance to the processor, is used for determining whether the length from "a" to "b" reaches a predefined length "L" stored in the template. If the length from the point "a" to "b" reaches the predefined length "L" stored as the template, the processor determines the swipe action substantially matches the template. Accordingly, the image capturing identifier is displayed in the screen to indicate that the step of capturing the image is prepared.

In the present disclosure, the starting point and the target point of the swipe action are not fixed. As shown in FIG. 4B, the swipe may be any swipe on the surface 21, such as the swipe from a starting point "c" to a target point "d", or the swipe from a starting point "e" to a target point "f" Provided that the swipe length from starting point and the target point reaches the predefined length "L" (e.g., 3 cm) stored in the memory, the processor determines that the swipe action substantially matches the template. Hence, the image will be captured no matter which region or path is executed by the swipe action.

In addition, the present disclosure is further configured to display a focus area associated with the above region from the starting point to the target point. For example, as shown in FIG. 4C, the focus area is associated with the swipe which is executed from "a" to "b" and set as a triangle with a center in the starting point "a." As another example, the focus area may a triangle covering the swipe path from "a" to "b." Although the focus area is shown as the triangle in FIG. 4C, the focus area may be selected as a circle, a diamond, and any shape or pattern according to the device provider's presetting. Accordingly, the device automatically focuses using the focus area after the device determines that the swipe substantially matches the template.

Figure 5:
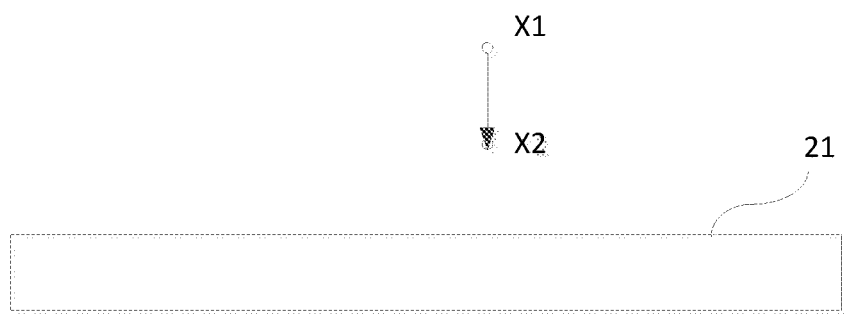
FIG. 5 is a schematic diagram illustrating the execution of the action input for capturing images through a gesture above the touch screen of the device in accordance with some embodiments of the present disclosure.

FIG. 5 is a schematic diagram illustrating the execution of the action input for capturing images through a gesture above the device's touch screen in accordance with some of the present disclosure's embodiments.

Referring to FIG. 5, the user indirectly approaches the surface of the screen 134 with a gesture above the surface of the screen 134, such as a tap from a point "X1" to another point "X2" as the action input. The points "X1" and "X2" are located in positions above the surface 21 instead of directly on it. In other words, the tap from the point "X1" to "X2" does not directly make contact with the touch screen of the device. Accordingly, the tap is sensed by the proximity sensor 164 instead of the touch sensor.

The sensor system 16 of the device 1 includes the proximity sensor 164, which is configured to detect the presence of nearby objects without any physical contact. The proximity sensor 164 may be set in the inner region of the device 1, surrounded by the screen 134 or in the adjacent region of the screen 134. The proximity sensor 164 can sense whether there is an object approaching or surrounding the surface of device 1, via electromagnetism or infrared without any direct contact. The lifespan of the proximity sensor is longer and more efficient, compared to the touch sensor.

The present disclosure can support all kinds of proximity sensors, including but not limited to: Emission Photoelectric Sensors, Direct Reflective Photoelectric Sensors, Specular Reflective Photoelectric Sensors, High Frequency Oscillation Proximity Sensors, Electrostatic Capacitance Proximity Sensors, Magnetic Proximity Sensors, Infrared Proximity Sensors, and the like.

An electrostatic-type touch screen is configured to sense the proximity of an object based on electric-field change in the object's proximity. Under such circumstances, the touch screen or the sensor included in the touch screen can be categorized as a proximity sensor. The proximity sensor can be configured to sense proximity gestures and a proximity gesture mode, wherein the proximity gesture mode includes proximity gesture distance, proximity gesture direction, proximity gesture velocity, proximity gesture time, proximity gesture location, and proximity gesture mobility status. The information corresponding to the sensed proximity gesture and proximity gesture mode can be outputted in the screen.

According to the present disclosure, the image to be captured is displayed on the preview portion of the surface 21. The user is allowed to execute the gesture through a spatial relationship with any area on the surface 21. For example, the user is allowed to execute the gesture above the surface 21 without any physical contact on the surface 21. Accordingly, the gesture above the surface 21 can be sensed by the proximity sensor 164. In the exemplary embodiment, as shown in FIG. 5, when the user moves his finger from point X1 (i.e. starting point) to point X2 (i.e. ending point) in a perpendicular direction towards the surface 21, the proximity sensor 164 senses the finger movement. The gesture and the proximity gesture mode are transmitted to the processor. If the template stored in the memory indicates the image will be captured when the distance between the ending point of the gesture and the surface is smaller than the distance between the starting point of the gesture and the surface, the processor will determine that the gesture from the point "X1" to "X2" substantially matches the template stored in the memory. Accordingly, the image will be captured. The detailed description of steps of focusing and capturing the image are omitted because they are similar to the steps of focusing and capturing described by referring FIG. 3C or 4C.

Although the exemplary embodiment as shown in FIG. 5 discloses that the gesture sensed by the proximity sensor is a tap or a movement toward the surface, it should be apparent that the embodiments are illustrated by way of example and not by way of limitation. Accordingly, the present disclosure can support any kind of gestures sensed by the proximity sensor, such as a swipe with a particular swipe length in a plane parallel to the surface of the device, a touch with a particular time above the surface, a predefined gesture with two fingers, and the like.

The foregoing three exemplary embodiments describe the process of image capturing via three action input modes, but the described embodiments are not restrictive and the present disclosure certainly supports the process of image capturing derived from the foregoing three exemplary embodiments.

As explained above, the method and device for capturing images according to the present disclosure permit the users to capture the image via touching or swiping any area on the surface instead of clicking the virtual shutter button. Furthermore, the method and device for capturing images according to the present disclosure also permits the user to capture the image through the action input around the screen, instead of making direct contact with the screen. Accordingly, the user may easily capture the images even if the user cannot see or find the virtual shutter button, which is always arranged at a fixed location on the screen.

Various embodiments described herein may be implemented in a computer-readable recording medium storing one or more programs for use by one or more processors 101. The computer can also include the CPU 10 of the device 1.

The computer-readable recording medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (e.g., memory 11).

The aforementioned methods can be implemented in a computer readable media recording computer-readable codes. The computer-readable media include all kinds of recording devices in which data readable by a computer system are stored. The computer-readable media include ROM, RAM, CD-ROM, magnetic tapes, floppy discs, optical data storage devices, and the like, as well as carrier-wave type implementations (e.g., transmission via Internet).

The foregoing description, for purpose of explanation, has been described with reference to embodiments. The present disclosure may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method of capturing an image in a device, the method comprising:
    displaying a preview of an image to be captured on a screen of the device;
    allowing a user to execute a capturing command with an action input through a spatial relationship with a region, wherein the region is any area on the surface of the screen;
    sensing the capturing command;
    comparing the capturing command to a template stored in a memory of the device, wherein the template is associated with image capturing, and consisting of a touch, a swipe, a gesture, a function of time, pressure, temperature, finger prints, or any combination thereof; and
    capturing the image if the capturing command substantially matches the template,
    wherein, after the comparison result is that the capturing command substantially matches the template, and before the image is captured, an automatic focusing using a focus area associated with the region is optionally comprised, and
    wherein the template is predefined by the user via the followed steps:
    repeating user inputs a number of times to record an average touch time, touch pressure, or length of wiping; and
    storing the average touch time, touch pressure, or length of swiping in the memory of the device as the template.

2. The method of claim 1, wherein the action input is selected from the group consisting of a touch, a swipe, a gesture, a function of time, pressure, temperature, finger prints, and any combination thereof.

3. The method of claim 1, wherein the spatial relationship with the region is on a surface of the region, onto the surface of the region, against the surface of the region, away from the surface of the region, or above the surface of the region.

4. The method of claim 1, wherein the region is any area within the displayed preview of the image.

5. The method of claim 1, wherein the screen is a touch screen and the action input is sensed by one or more touch sensors of the touch screen.

6. The method of claim 1, wherein the action input is sensed by one or more proximity sensors of the device.

7. The method of claim 1, further comprising a step of displaying an image capturing identifier on the screen after the device determines the action input substantially matches the template, wherein the image is captured after the image capturing identifier is displayed.

8. The method of claim 1, wherein a focus indicator is displayed in the region.

9. A device for capturing an image, comprising:
    a processor;
    a sensor coupled to the processor, the sensor configured to sense an action input and send the sensed action input to the processor;
    an image capturing unit coupled to the processor, the image capturing unit configured to capture the image;
    a screen coupled to the processor; and
    a memory coupled to the processor,
    wherein the processor is configured to perform steps comprising:
    displaying an preview of an image to be captured on the screen of the device;
    allowing a user to execute a capturing command with the action input through a spatial relationship with a region, wherein the region is any area on the surface of the screen;
    sensing the capturing command;
    comparing the capturing command to a template stored in the memory of the device, wherein the template is associated with image capturing, and consisting of a touch, a swipe, a gesture, a function of time, pressure, temperature, finger prints, or any combination thereof; and
    capturing the image if the capturing command substantially matches the template,
    wherein, after the comparison result is that the capturing command substantially matches the template, and before the image is captured, an automatic focusing using a focus area associated with the region is optionally comprised, and
    wherein the template is predefined by the user via the followed steps:
    repeating user inputs a number of times to record an average touch time, touch pressure, or length of wiping; and
    storing the average touch time, touch pressure, or length of swiping in the memory of the device as the template.

10. The device of claim 9, wherein the screen is a touch screen and the action input is sensed by one or more touch sensors of the touch screen.

11. The device of claim 9, wherein the action input is sensed by one or more proximity sensors of the device.

12. The device of claim 9, wherein the action input is selected from the group consisting of a touch, a swipe, a gesture, a function of time, pressure, temperature, finger prints, and any combination thereof.

13. The device of claim 9, wherein the spatial relationship with the region is on a surface of the region, onto the surface of the region, against the surface of the region, away from the surface of the region, or above the surface of the region.

14. The device of claim 9, wherein the region is any area within the displayed preview of the image.

15. A non-transitory computer readable recording medium storing one or more programs for use by a processor of a device to perform a process comprising:
    displaying a preview of an image to be captured on a screen of the device;
    allowing a user to execute a capturing command with an action input through a spatial relationship with a region, wherein the region is any area on the surface of the screen;
    sensing the capturing command;
    comparing the capturing command to a template stored in a memory of the device, wherein the template is associated with image capturing, and consisting of a touch, a swipe, a gesture, a function of time, pressure, temperature, finger prints, or any combination thereof; and capturing the image if the capturing command substantially matches the template, wherein, after the comparison result is that the capturing command substantially matches the template, and before the image is captured, an automatic focusing using a focus area associated with the region is optionally comprised, and wherein the template is predefined by the user via the followed steps:

repeating user inputs a number of times to record an average touch time, touch pressure, or length of wiping; and storing the average touch time, touch pressure, or length of swiping in the memory of the device as the template.

16. The non-transitory computer readable recording medium of claim 15, wherein the action input is selected from the group consisting of a touch, a swipe, a gesture, a function of time, pressure, temperature, finger prints, and any combination thereof.

17. The non-transitory computer readable recording medium of claim 15, wherein the spatial relationship with the region is on a surface of the region, onto the surface of the region, against the surface of the region, away from the surface of the region, or above the surface of the region.

* * * * *